(12) United States Patent
Knipfer et al.

(10) Patent No.: US 7,269,474 B1
(45) Date of Patent: Sep. 11, 2007

(54) CONTROLLED SELF-ADJUSTING PROCESS FOR REDUCING SELECTED DIMENSIONS OF ELECTRONIC PRODUCTS

(75) Inventors: Ivory Wellman Knipfer, Rochester, MN (US); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/532,365

(22) Filed: Sep. 15, 2006

(51) Int. Cl.
*G06F 7/00* (2006.01)

(52) U.S. Cl. .................. 700/219; 700/95; 705/29; 705/407; 705/415; 53/447; 53/540; 206/739

(58) Field of Classification Search .......... 700/95, 700/219; 705/23, 26, 29, 406, 407, 415; 414/1–21; 222/143; 206/736, 739; 53/447, 53/531, 540, 541
See application file for complete search history.

(56) References Cited

U.S. PATENT DOCUMENTS

| | | | |
|---|---|---|---|
| 6,064,982 A * | 5/2000 | Puri | 705/27 |
| 6,721,762 B1 * | 4/2004 | Levine et al. | 707/104.1 |
| 6,748,286 B1 | 6/2004 | Losch | |
| 6,832,435 B2 | 12/2004 | Sanders et al. | |
| 2003/0200111 A1 * | 10/2003 | Damji | 705/1 |
| 2005/0055181 A1 * | 3/2005 | Verdura et al. | 703/1 |

* cited by examiner

*Primary Examiner*—Leo Picard
*Assistant Examiner*—Sheela Rao
(74) *Attorney, Agent, or Firm*—Duke W. Yee; Gregory M. Doudnikoff; James O. Skarsten

(57) ABSTRACT

A method provides a self-learning mechanism for developing a database of information to be used in guiding selection of parts for temporary removal from a product, in order to reduce product dimensions for shipping and delivery or the like. In one embodiment a product is of a specified type, such as a specified computer product, and comprises a configuration of parts. A procedure is first carried out to select parts for removal from the product, in order to reduce one or more dimensions by pre-specified corresponding amounts. The selected parts are removed, and also listed in a Reduction History Record constructed to indicate the parts removed from successive orders of the specified product type. A work reduction unit is created that comprises the selected parts, and a routing is generated for the work unit, for use in guiding delivery and re-installation of the selected parts back into the product.

20 Claims, 4 Drawing Sheets

FIG. 2

| PRODUCT TYPE | REDUCTION TYPE | BILL OF MATERIAL | PART NO. | LOC 1 | LOC 2 | INCLUDE COUNT | EXCLUDE COUNT |
|---|---|---|---|---|---|---|---|
| 2107-92E | WR | 00P5579 | 97P2372 | 2R01 | LM17 | 0 | 27 |
| 2107-92E | WR | 09P2588 | 21P4437 | 2R01 | LM17 | 0 | 25 |
| 2107-92E | WR | 09P2588 | 21P4491 | 2R01 | LM17 | 0 | 25 |
| 2107-92E | WR | 17P7712 | 1621381 | 2R01 | | 0 | 33 |
| 2107-92E | WR | 17P7712 | 1621842 | 2R01 | | 0 | 33 |
| 2107-92E | WR | 17P7712 | 00G1268 | 2R01 | | 0 | 33 |
| 2107-92E | WR | 17P7712 | 07H6655 | 2R01 | | 0 | 33 |
| 2107-92E | WR | 17P7712 | 17P7716 | 2R01 | | 0 | 33 |
| 2107-92E | WR | 17P7717 | 22R1128 | 2R01 | PE01 | 0 | 41 |
| 2107-92E | WR | 17P7742 | 17P7897 | 2R01 | F01 | 0 | 41 |
| 2107-92E | WR | 17P7744 | 17P7743 | 2R01 | R25 | 0 | 25 |
| 2107-92E | WR | 17P7744 | 17P7743 | 2R01 | R28H | 0 | 11 |
| 2107-92E | WR | 17P7744 | 17P7743 | 2R01 | R32 | 17 | 2 |
| 2107-92E | WR | 17P7744 | 17P7655 | 2R01 | R35H | 22 | 0 |
| 2107-92E | WR | 22R1128 | 22R1129 | 2R01 | PE01 | 7 | 12 |
| 2107-92E | WR | 22R1128 | ADRAWER | 2R01 | PE01 | 0 | 19 |
| 2107-92E | WR | DUMMY | | 2R01 | LM17 | 5 | 18 |

CONTROLLED SELF-ADJUSTING PROCESS FOR REDUCING SELECTED DIMENSIONS OF ELECTRONIC PRODUCTS

BACKGROUND OF THE INVENTION

1. Field of the Invention

The invention disclosed and claimed herein generally pertains to a method and apparatus for controllably reducing height, weight or other dimensions of configured computer or other products, in order to meet shipping and delivery constraints. More particularly, the invention pertains to a method of the above type wherein a self-adjusting mechanism is used in determining which parts to remove from the product in order to achieve the desired dimensional reduction. Even more particularly, the invention pertains to a method of the above type wherein the mechanism provides a historical record of parts removed from previous orders of a specified product type, in order to achieve height, weight or other reductions.

2. Description of the Related Art

Configured computer products are ordered and produced in accordance with procedures to ensure that a complete functional product, of high quality and able to meet all operational standards, is delivered to a customer. In carrying out transactions of this type, it often happens that some of the products may exceed certain customer facility size requirements, such as height and/or weight. For example, a product may be too wide, tall or heavy to be put on elevators, rolled under doorways, or carried over certain raised floors. Besides customer site limitations, it is possible that the produced product exceeds transportation limitations. Typically, customer or distribution restrictions of these types are not automatically planned for or taken into account during manufacturing. Accordingly, there is no controlled process for ensuring that products are built and tested to achieve quality expectations, and at the same time are designed to enable temporary reductions in product size, in order to meet shipping, delivery or other customer imposed constraints. Usually, when shipping or delivery requires reduction of a product dimension, one or more parts will be removed from the product as necessary. However, this process creates a further complication, in that the removed parts must often be reinstalled exactly as removed, in order for the produced product to function properly.

Current approaches for reducing product dimensions tend to be manual, are non-standardized, and generally provide little or no guidance to those who must carry out the reduction tasks. This is due to the variability in product configuration, and the corresponding impact on product bill of material (BOM) structure. For example, with regard to products such as computer systems, each product has its own unique configuration, and each customer order will generally be unique. As a result, it is not practical for the BOM structure to represent or describe all the possible approaches that could be followed, in removing parts from a product to achieve a necessary reduction. A further difficulty is that such products must be completely assembled, so that they can be tested and certified as meeting all specifications and requirements. Usually, the complete assembly and testing is done before parts can be removed to reduce height or weight.

It will be appreciated that removal of parts from a completed product is likely to generate an additional set of problems and concerns. These concerns include ensuring that the right devices or parts are pulled from the product, limiting the removed parts to the minimum necessary, ensuring the removed parts are exposed to the appropriate operations, and ensuring that removals are done at the last possible moment to avoid the impact of unexpected customer product alterations. Moreover, after parts are removed and placed in containers, measures must be taken to prevent the containers from becoming lost or separated from the reduced product. If the reduced product and parts containers are to be shipped from one country to another, it may be necessary to declare the contents of each container for customs. At present, it is very common to make errors in such customs declarations, particularly if an order involves a large number of containers with removed parts.

When the reduced product arrives at the site or location of its intended use, it must be rebuilt by re-installing the removed parts. Accordingly, it is important to ensure that any instructions needed to re-install the removed parts are made available at the site for the rebuilding task. Moreover, if the product comprises multiple units that are similar to one another, the groups of removed parts may likewise appear similar to one another. However, it may also be critical, for correct product operation, to ensure that the parts taken from a unit are re-installed only on that same unit. Accordingly, measures must be taken to prevent the different part groups from becoming mixed up or interchanged with one another.

BRIEF SUMMARY OF THE INVENTION

In accordance with the invention, a self-adjusting or self-learning process is established, in order to develop a database of information. This information is then used to guide selection of parts for temporary removal or disassembly from a product, in order to reduce product dimensions for shipping and delivery or the like. In one aspect of the invention, the removal of parts is referred to as a work reduction operation that creates new manufacturing work units. Process routings for the new work units are also created, which allow additional operations to occur on the new work units as though they were predetermined. In one embodiment of the invention, wherein a product is of specified type and comprises a completed configuration of parts, a procedure is first initially carried out to select one or more parts for removal from the product, in order to reduce one or more dimensions by pre-specified corresponding amounts. The method further comprises removing the selected parts from the product, and listing each of the selected and removed parts in a Reduction History Record constructed to indicate the parts removed from successive orders of products of the specified type. One or more reduction work units are created, wherein each reduction work unit comprises one or more of the selected parts. A routing is generated for each of the reduction work units, for use in guiding delivery and re-installation of the selected parts back into the product.

It is anticipated that embodiments of the invention will significantly reduce manual work, and will also reduce associated errors and cycle time in performing height and weight reductions. Moreover, an auditable process will be provided that can meet import/export compliance procedures. The invention also provides a process that can be made controllable and repeatable, so that it can be automated and carried out at a manufacturing location by workers or operators that have comparatively low skill levels. Processes of the invention can also provide direction and assistance to those responsible for re-installing removed parts to the products at customer sites, and who must restore the product back to its complete and initially tested configuration.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a schematic diagram depicting a Reduction History Record for the embodiment of FIG. 1;

DETAILED DESCRIPTION OF THE INVENTION

Figure 1:
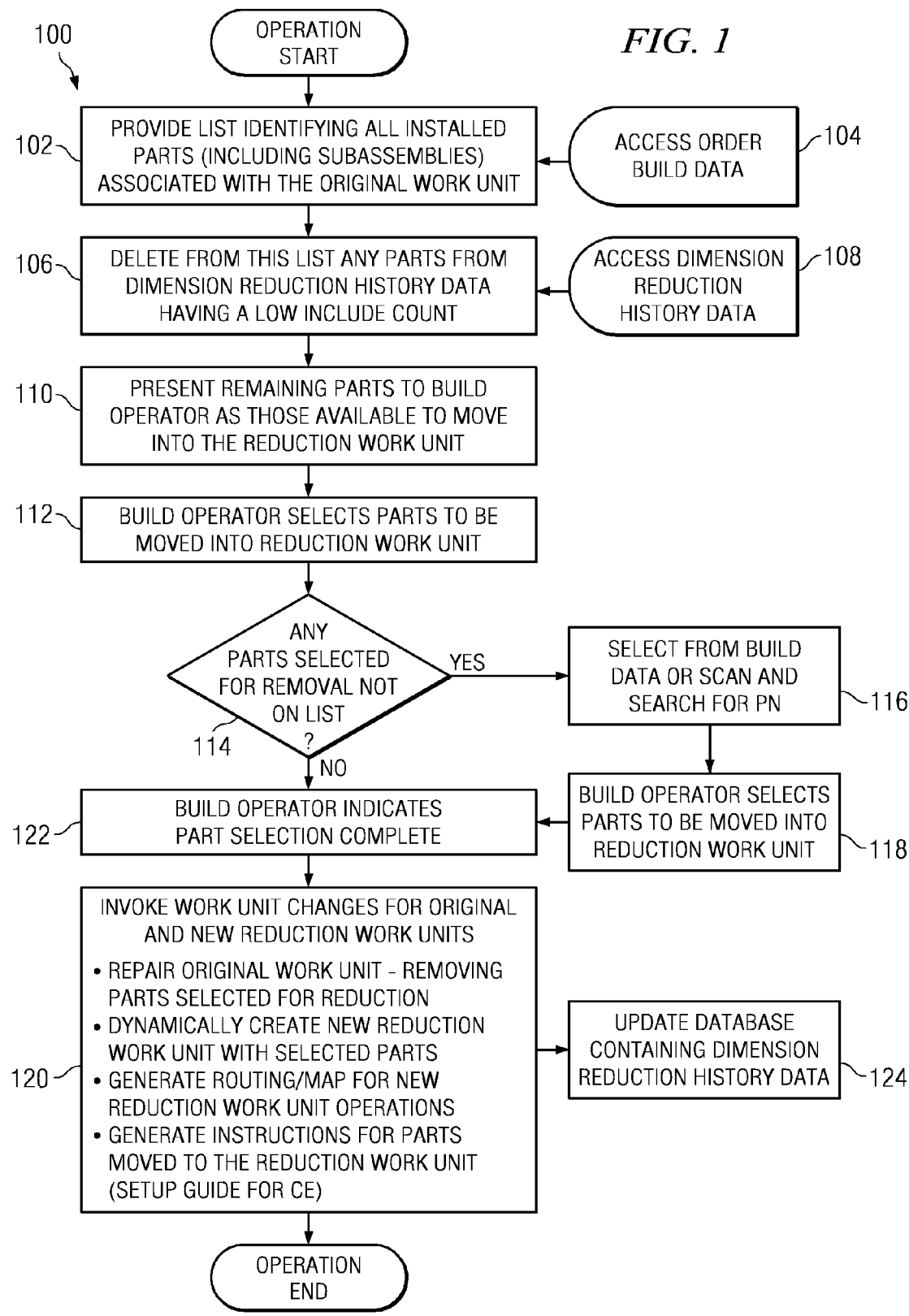
FIG. 1 is a flowchart showing steps of a method comprising an embodiment of the invention.

Referring to FIG. 1, there is shown a method or operation 100 comprising an embodiment of the invention. Operation 100 is in fact a stage or operation included in the over-all process of assembling, testing and delivering a product to a customer, wherein shipping or delivery requires reduction of one or more product dimensions. Such dimensions typically include height and weight of a product, wherein reduction is required due to height limitations of a door or other structure through which the product must pass, or by the weight capacity of an elevator. Dimensions may also pertain to product width or center of balance, where there is concern that the product might tip over. Dimensions, as used herein, may even pertain to reducing the cost or value of a unit, as it is moving through commerce. However, embodiments of the invention are not to be limited to the above product dimensions.

Operation 100 is usefully included in the over-all customer order, and is executed only if the order requires product dimension reduction for some reason. Thus, until operation 100 is commenced, the product order can be processed normally, as if there will be no dimensional reductions. Usefully, operation 100 is commenced after completing assembly and testing of the product, and may be started by flagging an item in the product Bill of Materials (BOM) or by other order element. Embodiments of the invention usefully pertain to computer related and telecommunication products, but the invention is by no means limited thereto.

When operation 100 is started, the first step 102 thereof is to provide a list containing all parts that were installed into the completely assembled product, including sub-assemblies thereof as well as assemblies built by vendors. The complete product may also be referred to as the Original Work Unit. Step 104 indicates that the parts list is furnished by accessing the order build data for the product, from an available database or the like (not shown). The parts list of step 102 is furnished to a data processing device, as shown for example in FIG. 4, wherein the data processing device may be configured to perform one or more steps of operation 100.

While the parts list supplied at step 102 discloses all parts built into the product, it will be appreciated that some of the assembled parts cannot easily be removed from the product, and it may not be desirable to remove other parts for various reasons. Also, it may be preferable to remove some parts rather than other parts. Accordingly, at step 106 an effort is made to identify parts that should not be considered for removal, so that such parts can be deleted from the parts list. This is accomplished by means of Dimension Reduction History Data, which is accessed at step 108 from a database (not shown), and provided for use at step 106. Parts not deleted at step 106 remain available as recommended for removal, and may thus be selected for a work reduction unit as described hereinafter.

An important aspect of the invention is a self-learning mechanism, which provides guidance and recommendations as to what parts should be removed from the product, in order to achieve height, weight or other dimensional reductions. This mechanism generates the Dimension Reduction History Data referred to above, which provides guidance both in regard to parts that could be removed from the product, and parts that should not be removed therefrom. More particularly, as dimensional reduction orders are successively processed for a specified type of product, the mechanism teaches or trains itself to make helpful recommendations for future orders of the product type. This is accomplished by building a Reduction History Record that contains the Dimension Reduction History Data.

Referring to FIG. 2, there is shown a Reduction History Record 200, as described above. Column 202 of Record 200 identifies the type of product to which data in the record pertains, and Column 204 indicates the product dimension that was being reduced. For example, WR indicates removal parts for weight reduction, HR for height reduction, and TH to overcome a top heavy condition. Each row of Record 200 pertains to a part of the specified product type, wherein Column 208 indicates the respective part numbers. BOM and locations of respective parts are shown at Columns 206 and 210, respectively. Column 212 contains an include count for each part, and Column 214 contains an exclude count therefore.

As described hereinafter in further detail, each operation 100 produces a decision as to which parts will be removed from a product of the specified type. Moreover, an important task of each operation 100 is to notify a database containing the Reduction History Record 200 of the removed parts, so that the Record 200 can be updated thereby. More particularly, the include and exclude counts for respective parts are updated, each time an order for a product of the specified type requires height, weight or other dimensional reduction. The include count for a part shows the number of times, for previous orders of the product type, that the part was in the unit of work at step 102, and was then in fact selected for the work reduction unit. The exclude count for a part shows the number of times, for previous orders of the product type, that the part was determined to be in the unit of work, but was not selected for the work reduction unit. It will be readily apparent that as Record 200 is continually updated by successive orders, the include count and exclude count data provides an increasingly useful tool for deciding which parts should be selected for dimension reductions.

Returning now to step 106 of FIG. 1, it is seen that parts with low include counts, as shown by Reduction History Record 200, may be deleted from the recommended removal list. For example, a part may be deleted if its include count is zero, or if the include count is less than ten percent of the corresponding exclude count. A zero value would indicate that in previous orders, the part was never removed from the product. A low percentage value would indicate that the part was rarely selected for removal.

Referring further to FIG. 1, step 110 shows that the parts remaining on the parts list, following step 106, are presented to the build operator as being recommended for movement into a Reduction Work Unit. That is, all such parts are recommended for removal from the product, in order to achieve the desired reduction. The candidate parts finally selected for removal are collectively treated as the Reduction Work Unit, which comprises a related set of components that are subsequently processed together.

At step 112, the build operator selects the parts to be moved into the Reduction Work Unit, from the part candidates presented at step 110. In some embodiments of the invention, the build operator will be a human operator. In other embodiments, it is anticipated that the operator will comprise a processing device, and will select parts based on recognizing pre-programmed conditions or criteria.

It has been recognized that the environment in which parts are selected for reduction may change. Accordingly, the operator must be able to override the part candidates list presented at step 110. This is achieved at step 114, which queries whether any parts selected for removal were not on the recommended list. If not, the process of selecting parts for removal is complete, as shown by step 122. However, if any selected parts were not on the list, the part numbers (PN) of such parts must be identified, so that the parts can be moved into the Reduction Work Unit, as shown by steps 116 and 118.

Step 120 of FIG. 1 shows a number of tasks which are to be completed before operation 100 ends. One such task is removal of the parts from the Original Work Unit. This task is treated in the order processing system as a repair of the Original Work Unit.

As described above, a new Reduction Work Unit is dynamically created, which comprises the parts selected for removal to meet height, weight or other reduction requirements. After the creation, the Reduction Work Unit undergoes numerous post reduction operations that are standard in the normal order processing system. Also, the order system will be accurately informed of both adjustments to the Original Work Unit, and the contents of each container used for removed parts of the new Reduction Work Unit. As a result, import/export declarations can be generated with great accuracy and efficiency, to fully comply with import/export requirements. As a further advantage, multiple reductions, such as both height and weight reductions, can be processed on the same order.

The dynamic creation of the new Reduction Work Unit also generates a routing or map for the Reduction Work Unit. The routing comprises a path of tasks or operations to be performed during the reduction process. This process includes capturing the original manufacturing and installation instructions, graphics and placement information, and automatically bundling these elements for shipment in the container used for the removed parts. Also, an associated part number is inserted into the order, to dynamically force the instructions to be scanned and installed in the Reduction Work Unit. By taking these actions, manufacturing configuration data and field instructions, for use in re-assembling removed parts, will be provided to the customer or CE at the final destination of the product.

As a further benefit, the reduction process causes reduction activities to be performed on a unit by unit basis. Accordingly, the installation instructions that are provided to the customer will inform the customer of the specific unit that the installations pertain to. It is anticipated that this feature will significantly reduce confusion in re-assembling removed parts, such as when there are multiple units and multiple groups of similar removed parts.

When operation 100 ends, a further task, as shown by step 124, is to update the Reduction History Data contained in the database. This is done by updating the include and exclude count data for each part that is identified in the installed parts list of the order, as described above in connection with step 102.

Figure 3:
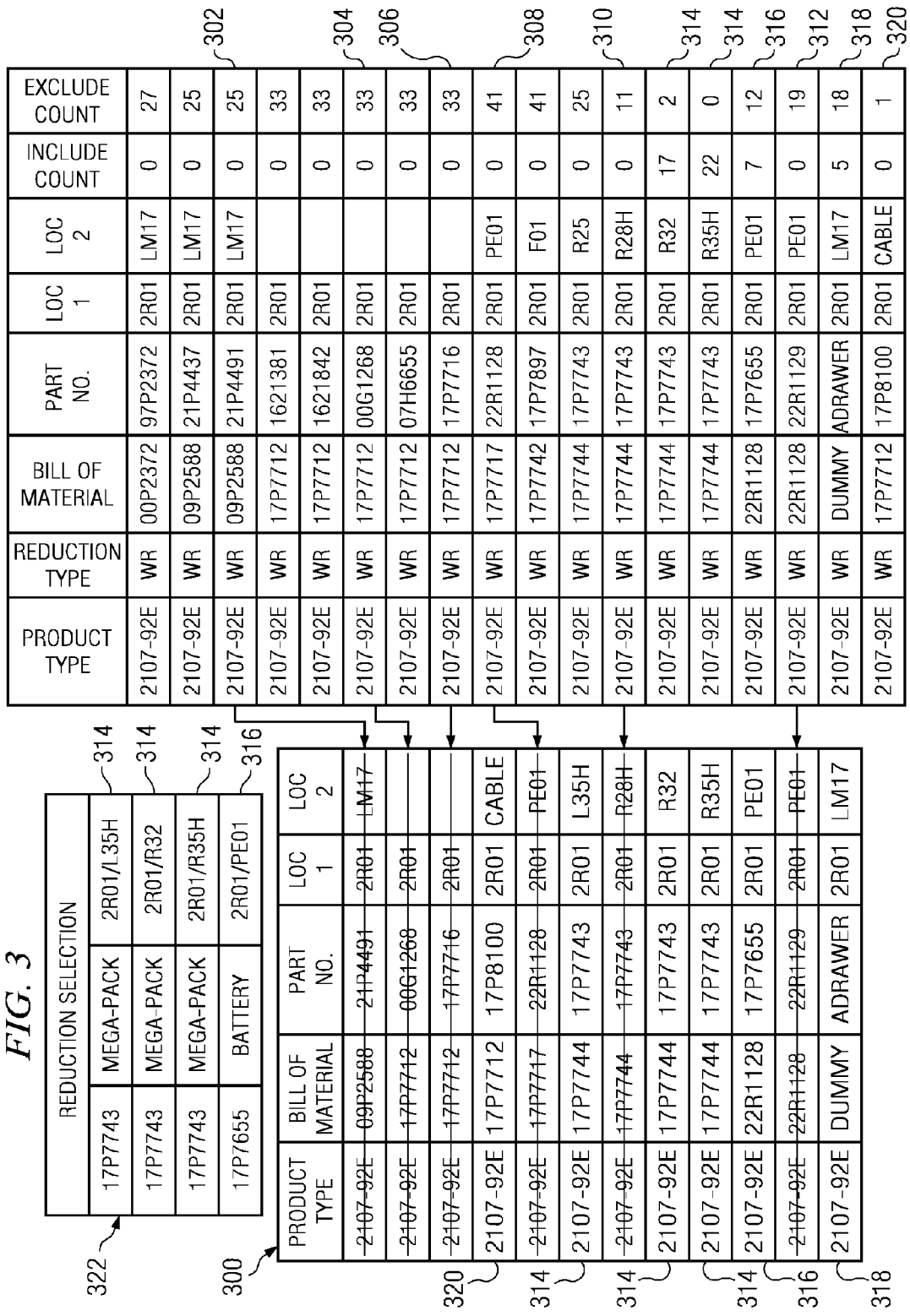
FIG. 3 is a schematic diagram further illustrating certain steps of the embodiment of FIG. 1.

Referring to FIG. 3, there is shown Reduction History Record 200 together with a list 300 of the type furnished at Step 102 of FIG. 1. As described above, list 300 includes all parts installed into the completed product. To further illustrate step 106 of FIG. 1, Record 200 is compared with the installed parts list 300. It is seen that the parts identified by part numbers at rows 302-312 are all included in the list 300. However, the include counts for each of these parts is zero. Accordingly, all such parts are deleted from parts list 300.

Referring further to FIG. 3, it is seen that the parts of rows 314, 316 and 318 of Record 200 are also found on installed parts list 300. For these parts, the include count is non-zero, and each include count is greater than ten percent of the corresponding exclude count. Thus, these parts remain on list 300, as recommendations for selection to the new Reduction Work Unit. The part shown in row 320 was not involved in prior orders for reduction, and therefore there was previously no data for such part in Record 200. Accordingly, there is no basis for deleting the part of row 320 from list 300.

FIG. 3 further shows the final selection 322, carried out at step 112 of FIG. 1, of parts that are to be moved into the new Reduction Work Unit. These are the parts of rows 314 and 316. When operation 100 ends, Record 200 must be updated to enter thereinto data for the part in row 320 including its corresponding count information. Record 200 must be further updated to show the include and exclude counts for each of the other parts contained in list 300.

Figure 4:
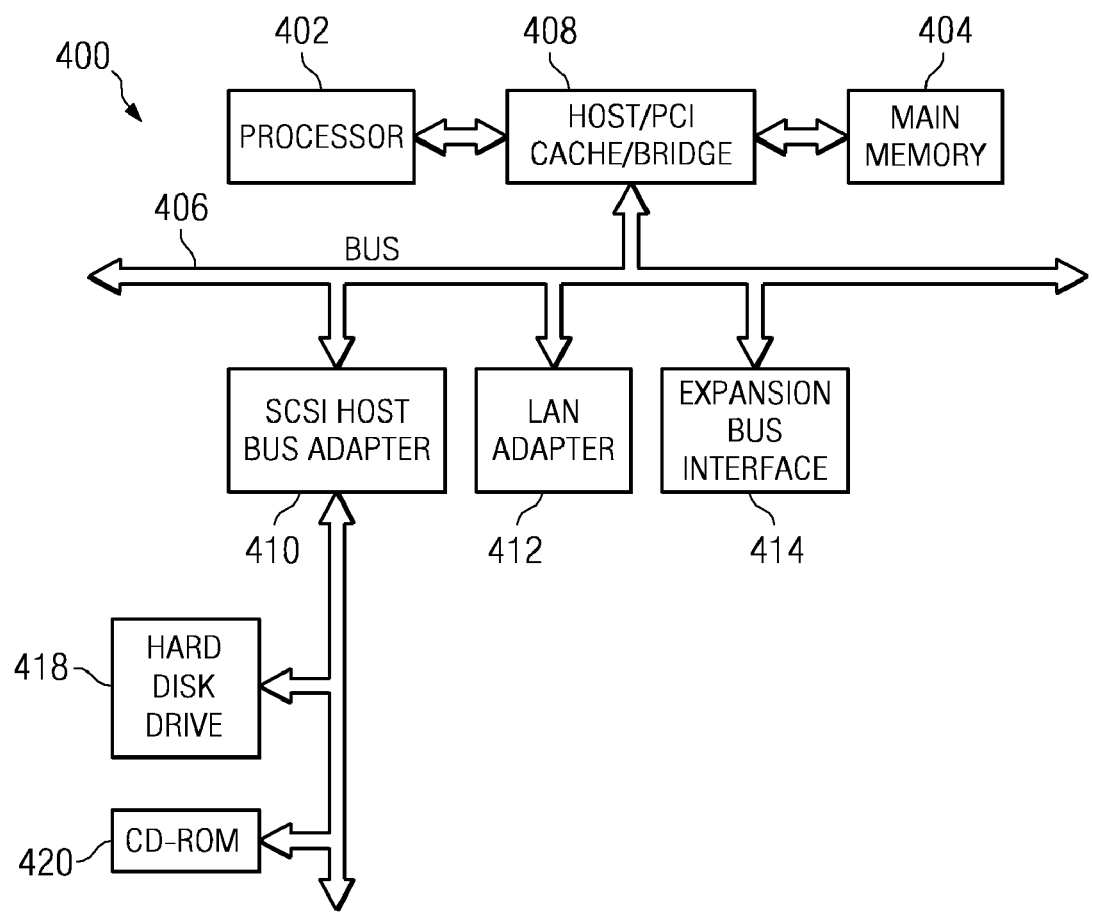
FIG. 4 is a block diagram showing a computer or data processing system that may be used in implementing embodiments of the invention.

In a useful embodiment of the invention, a computer or data processing system may be configured to carry out some or all of the steps shown in FIG. 1. Referring to FIG. 4, there is shown a block diagram of a generalized data processing system 400 which may be used in such embodiment. Data processing system 400 exemplifies a computer, in which code or instructions for implementing the processes of the present invention may be located. Data processing system 400 usefully employs a peripheral component interconnect (PCI) local bus architecture, although other bus architectures may alternatively be used. FIG. 4 shows a processor 402 and main memory 404 connected to a PCI local bus 406 through a Host/PCI bridge 408. PCI bridge 408 also may include an integrated memory controller and cache memory for processor 402.

Referring further to FIG. 4, there is shown a local area network (LAN) adapter 412, a small computer system interface (SCSI) host bus adapter 410, and an expansion bus interface 414 respectively connected to PCI local bus 406 by direct component connection. SCSI host bus adapter 410 provides a connection for hard disk drive 418, and also for CD-ROM drive 420.

An operating system runs on processor 402 and is used to coordinate and provide control of various components within data processing system 400 shown in FIG. 4. The operating system may be a commercially available operating system such as Windows XP, which is available from Microsoft Corporation. Instructions for the operating system and for applications or programs are located on storage devices, such as hard disk drive 418, and may be loaded into main memory 404 for execution by processor 402.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer useable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In connection with delivery of a product of specified type to a specified location, wherein the product comprises a configuration of parts and delivery requires reducing one or more dimensions of the product by respective corresponding amounts, a method comprising the steps of:
   carrying out a procedure to select one or more parts for removal from said product, in order to reduce each of said dimensions by its corresponding amount;
   listing each of said selected parts in a Reduction History Record constructed to indicate the parts removed from successive orders of products of said specified type;
   creating one or more reduction work units, wherein each reduction work unit comprises one or more of said selected parts; and
   generating a routing for each of said reduction work units, for use in guiding the delivery of said selected parts, and the re-installation of said selected parts back into said product, at said specified location.

2. The method of claim 1, wherein:
   said parts selection procedure comprises a first step of listing candidate parts available for removal from said product, a second step of recommending parts to be removed from said product, and a third step of selecting parts from said listed recommended parts for removal from said product.

3. The method of claim 2, wherein:
   said step of recommending parts is based on data from said Reduction History Record.

4. The method of claim 3, wherein:
   said Reduction History Record contains exclude counts and include counts for respective parts of said product, the exclude count for a given part indicating the number of times the given part was not removed in said product orders, and the include count for the given part indicating the number of times the given part was removed in said product orders.

5. The method of claim 2, wherein:
   data in said Reduction History Record is automatically updated to represent the results of said first and third steps of said parts selection procedure.

6. The method of claim 2, wherein:
   said third step is performed by a human build operator.

7. The method of claim 1, wherein:
   successive steps of said method are performed by a selectively configured data processing device.

8. The method of claim 1, wherein:
   said routing comprises procedures for directing said reduction work units to said specified location, and for re-installing said selected parts back into said product.

9. The method of claim 8, wherein:
   information for use in re-installing said parts back into said product is shipped together with each of said reduction work units.

10. The method of claim 1, wherein:
    said product dimensions to be reduced are selected from a group that includes at least product height, product weight and product width.

11. In connection with delivery of a product of specified type to a specified location, wherein the product comprises a configuration of parts and delivery requires reducing one or more dimensions of the product by respective corresponding amounts, a computer program product in a computer readable medium comprising:
    first instructions for carrying out a procedure to select one or more parts for removal from said product, in order to reduce each of said dimensions by its corresponding amount;
    second instructions for listing each of said selected and removed parts in a Reduction History Record constructed to indicate the parts removed from successive orders of products of said specified type;
    third instructions for creating one or more reduction work units, wherein each reduction work unit comprises one or more of said selected parts; and
    fourth instructions for generating a routing for each of said reduction work units, for use in guiding delivery of said selected parts and re-installation of said selected parts back into said product, at said specified location.

12. The computer program product of claim 11, wherein:
said parts selection procedure comprises a first step of listing candidate parts available from said product, a second step of recommending parts for removal, and a third step of selecting parts for removal from said product.

13. The computer program product of claim 12, wherein:
said step of recommending parts is based on data from said Reduction History Record.

14. The computer program product of claim 13, wherein:
said Reduction History Record contains exclude counts and include counts for respective parts of said product, the exclude count for a given part indicating the number of times the given part was not removed in said product orders, and the include count for the given part indicating the number of times the given part was removed in said product orders.

15. The computer program product of claim 12, wherein:
data in said Reduction History Record is automatically updated to represent the results of said first and third steps of said parts selection procedure.

16. In connection with delivery of a product of specified type to a specified location, wherein the product comprises a configuration of parts and delivery requires reducing one or more dimensions of the product by respective corresponding amounts, an apparatus comprising:
  a first processing device for carrying out a procedure to select one or more parts for removal from said product, in order to reduce each of said dimensions by its corresponding amount;
  a database containing a Reduction History Record, said Reduction History Record constructed to indicate the parts removed from successive orders of products of said specified type; and
  a second processing device for creating one or more reduction work units, wherein each reduction work unit comprises one or more of said selected parts and for generating a routing for each of said reduction work units, said routing for use in guiding the delivery of said selected parts and the re-installation of said selected parts back into said product, at said specified location.

17. The apparatus of claim 16, wherein:
said first processing device carries out a parts selection procedure comprising a first step of listing candidate parts available for removal from said product, a second step of recommending parts for removal, and a third step of selecting parts from said listed candidate parts for removal from said product.

18. The apparatus of claim 17, wherein:
said step of recommending parts is based on data from said Reduction History Record.

19. The apparatus of claim 18, wherein:
said database is adapted to provide a Reduction History Record containing exclude counts and include counts for respective parts of said product, the exclude count for a given part indicating the number of times the given part was not removed in said product orders, and the include count for the given part indicating the number of times the given part was removed in said product orders.

20. The apparatus of claim 17, wherein:
data in said Reduction History Record is automatically updated to represent the results of said first and third steps of said parts selection procedure.

* * * * *